US006658461B1

(12) United States Patent
Mazo

(10) Patent No.: US 6,658,461 B1
(45) Date of Patent: Dec. 2, 2003

(54) METHOD OF, SYSTEM FOR, AND COMPUTER PROGRAM PRODUCT FOR PROVIDING A USER INTERFACE FOR CONFIGURING CONNECTIONS BETWEEN A LOCAL WORKSTATION FILE SYSTEM AND A REMOTE HOST FILE SYSTEM

(75) Inventor: Gary I. Mazo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/580,354

(22) Filed: May 25, 2000

(51) Int. Cl.[7] ............................ G06F 15/16; G06F 17/00
(52) U.S. Cl. ...................... 709/217; 709/218; 709/219; 707/33; 707/38
(58) Field of Search ............................... 709/217, 218, 709/219, 229, 250; 710/38, 33

(56) References Cited

U.S. PATENT DOCUMENTS

| | | | | |
|---|---|---|---|---|
| 4,999,766 A | * | 3/1991 | Peters et al. ................. | 707/10 |
| 5,742,792 A | * | 4/1998 | Yanai et al. ................. | 711/162 |
| 5,761,498 A | * | 6/1998 | Ooe et al. .................... | 707/10 |
| 5,870,549 A | | 2/1999 | Bobo, II ...................... | 395/200.36 |
| 5,930,817 A | * | 7/1999 | Mizuno et al. .............. | 711/114 |
| 5,970,490 A | | 10/1999 | Morgenstern ................ | 707/10 |
| 5,991,713 A | | 11/1999 | Unger et al. ................. | 704/9 |
| 6,219,669 B1 | * | 4/2001 | Haff et al. ................... | 707/10 |
| 6,219,693 B1 | * | 4/2001 | Napolitano et al. ........ | 709/203 |
| 6,240,442 B1 | * | 5/2001 | Domenikos et al. ........ | 709/203 |
| 6,356,901 B1 | * | 3/2002 | MacLeod et al. ........... | 707/6 |
| 6,385,655 B1 | * | 5/2002 | Smith et al. ................ | 709/232 |

FOREIGN PATENT DOCUMENTS

| WO | WO 98/34179 | 8/1998 | ........... G06F/17/30 |
|---|---|---|---|
| WO | WO 99/57649 | 11/1999 | ........... G06F/17/00 |

OTHER PUBLICATIONS

Using WS–FTP on the PC, WWW.canberra.edu.au/cts/training/internet/FTP/wsftp.html, pp. 1–5.*

WS_ftp pro tutorial—initiating an HTML file transfer, www.gtn.net.help_desk/ws_ftp/nav5.htm, p. 11.*

Student file transfer to triton, http://ccism.pc.athabascau.ca/html/students/stupage/vhd/ftp_stud.htm, Oct. 31, 1999, pp. 1–2.*

Rumba 2000—using AS/400 file transfer, Rumba technical bulletin, Jul. 29, 1999, pp. 1–15.*

*XML/ The Language Of Integration—The Meta–Language Standard Provides An Easy And Available Way To Identify And Share Data*, INFORMATIONWEEK—Nov. 1, 1999 / p. PG141.

Stanek, William Robert, *Applications Development Environments. (Ais Software's Balise 4.0, OmniMark Technologies' Konstructor, Perspecta's SmartContent System)*, PC Magazine, n17, v17, Oct. 6, 1998 / p235 (1).

King, Nelson, *Dynamic XML Duo. (Object Design eXcelon Server 1.0 Internet/Web Database Software, Bluestone Software's XML Suite 1.0 Internet/Web Server Software)*, Intelligent Enterprise, 10, 2, Jul. 13, 1999 / 50.

(List continued on next page.)

*Primary Examiner*—Krisna Lim
(74) *Attorney, Agent, or Firm*—Prentiss Wayne Johnson

(57) ABSTRACT

A user interface for configuring connections from a local workstation between a file system residing on the local workstation and a file system residing on a remote host system. The interface provides for such configuration by allowing the user to specify the host system, specify a host directory path within the host file system, and specify a mapping between a file within the host directory path on the host file system and a file on the local file system. After such configuration, the user may access the host file system file in the same manner as a local file system file.

24 Claims, 12 Drawing Sheets

OTHER PUBLICATIONS

*New Release Of Bluestone Visual—XML Expands XML Integration Options, Eases Application Customization.* (*Bluestone Software's Bluestone Visual—XML 1.1 Application Development Software*), EDGE: Work–Group Computing Report, Nov. 15, 1999 / NA.

Linthicum, David S., *Site Building: What XML Means To You.* (*Extensible Markup Language*) (*Internet/Web/Online Service Information*), Computer Shopper, n7, v18, Jul., 1998 / p448 (1).

Stanek, William Robert, *Structuring Data With XML.* (*Internet/Web/Online Service Information*), PC Magazine, n10, v17, May 26, 1998 / p229 (1).

Booker, Ellis, *Vendors Debut XML Development Tools*, InternetWeek, Nov. 15, 1999 / 16.

Borck, James R., *Visual XML Eases Integration: Wizard– Driven Bluestone Solution Makes Rapid Deployment A Breeze.* (*Bluestone Software's Bluestone Visual XML 1.1 Application Development Software*), InfoWorld, 45, 21, Nov. 8, 1999 / 57.

Davydov, Mark, *XAS: E—Application Server Ascendant.* (*Xml Application Server*) (*Technology Information*), Intelligent Enterprise, 14, 2, Oct. 5, 1999 / 32.

Gonsalves, Antone, *XMI Puts Component Modelers On The Same Page.* (*Extensible Markup Language Metadata Interchange From IBM, Oracle Corp. And Unisys Corp* ) (*Company Business And Marketing*), PC Week, Nov 23, 1998 / 32(1).

Rist, Oliver, *XML Comes Of Age.* (*Internet/Web/Online Service Information*), InternetWeek, Aug. 16, 1999 / 31.

Messmer, Ellen, *Apache Software Foundation Launches XML Open–Source Project.* (*Industry Trend Or Event*), Network World, Nov. 15, 1999 / NA.

* cited by examiner

1400

```
<!-- XML Starts -->
<?xml version="1.0" encoding="US-ASCII">
<!DOCTYPE ffs-system SYSTEM "e:\IBMFFS\BIN\ffs_sys.dtd">
<ffs-system>
    <local-system>
        <default-local-codepage>IBM-850</default-local-codepage>
    </local-system>
    <system>
        <system-name>ffs1</system-name>
        <host>stplex4b.stl.ibm.com</host>
        <user>COBTSTA</user>
        <pass>sol1test</pass>
        <job-port>6715</job-port>
        <web-port>80</web-port>
        <default-host-codepage>IBM-037</default-host-codepage>
        <default-local-codepage>IBM-850</default-local-codepage>
        <transfer>text</transfer>
        <preferred-drive>D:</preferred-drive>
        <connect>y</connect>
        <default-dataset-attr>
            <mgmt-class> </mgmt-class>
            <storage-class> </storage-class>
            <dev-type> </dev-type>
            <data-class> </data-class>
            <space-units>TRKS</space-units>
            <avg-rec-unit>M</avg-rec-unit>
            <primary-qty>10</primary-qty>
            <secondary-qty>10</secondary-qty>
            <dir-blocks>20</dir-blocks>
            <recfm>FB</recfm>
            <recl>80</recl>
            <blk-size>3120</blk-size>
            <name-type> </name-type>
            <exp-date> </exp-date>
        </default-dataset-attr>
```

1610 — `<mapping-list>`
    `<mapping>`
1620 —         `<local-ext>cbl</local-ext>`
        `<host-name>**cobol</host-name>`
1630 —         `<transfer>text</transfer>`
    `</mapping>`
1640 —     `<mapping>`
        `<local-ext>cpy</local-ext>`
        `<host-name>**cobcopy</host-name>`
        `<transfer>text</transfer>`
    `</mapping>`
    `<mapping>`
        `<local-ext>pli</local-ext>`
        `<host-name>**pli</host-name>`
        `<transfer>text</transfer>`
    `</mapping>`
    `<mapping>`
        `<local-ext>obj</local-ext>`
        `<host-name>**obj</host-name>`
        `<transfer>binary</transfer>`
    `</mapping>`
    `<mapping>`
        `<local-ext>exe</local-ext>`
        `<host-name>**load</host-name>`
        `<transfer>binary</transfer>`
    `</mapping>`
    `<mapping>`
        `<local-ext>cmd</local-ext>`
        `<host-name>**clist</host-name>`
        `<transfer>text</transfer>`
    `</mapping>`
    `<mapping>`
        `<local-ext>jcl</local-ext>`
        `<host-name>**jcl</host-name>`
        `<transfer>text</transfer>`
    `</mapping>`
    `<mapping>`
        `<local-ext>cmd</local-ext>`
        `<host-name>**sigyclst</host-name>`
        `<transfer>text</transfer>`
    `</mapping>`

```
                    <mapping>
                            <local-ext>jcl</local-ext>
                            <host-name>**cntl</host-name>
                            <transfer>text</transfer>
                    </mapping>
                    <mapping>
                            <local-ext>lst</local-ext>
                            <host-name>**listing</host-name>
                            <transfer>text</transfer>
                    </mapping>
                    <mapping>
                            <local-ext>out</local-ext>
                            <host-name>**outlist</host-name>
                            <transfer>text</transfer>
                    </mapping>
                </mapping-list>
        </system>
</ffs-system>
<!— XML Ends —>
```

*Fig. 17*

METHOD OF, SYSTEM FOR, AND COMPUTER PROGRAM PRODUCT FOR PROVIDING A USER INTERFACE FOR CONFIGURING CONNECTIONS BETWEEN A LOCAL WORKSTATION FILE SYSTEM AND A REMOTE HOST FILE SYSTEM

CROSS-REFERENCE TO RELATED APPLICATIONS

Application Ser. No. 04,279,864 filed concurrently herewith on May 25, 2000 for METHOD OF, SYSTEM FOR, AND COMPUTER PROGRAM PRODUCT FOR PROVIDING A DATA STRUCTURE FOR CONFIGURING CONNECTIONS BETWEEN A LOCAL WORKSTATION FILE SYSTEM AND A REMOTE HOST FILE SYSTEM (IBM Docket STL200-0034), currently co-pending, and assigned to the same assignee as the present invention. The foregoing copending application is incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to computer file systems, and more particularly to a user interface for configuring connections between a file system residing on the local workstation and a file system residing on a remote host system.

2. Description of the Related Art

Connecting a workstation to a host, known as host workstation connectivity, may be a relatively straight forward terminal connection or emulation. It may also be a rather complex connection such as connecting, mapping, and converting files and directories from a host file system to a workstation file system to support a scenario such as Remote Edit/Compile/Debug.

Remote Edit/Compile/Debug provides a workstation environment for performing the edit, compile, and debug tasks associated with host application development. Application parts, such as COBOL source code, COBOL copy books, and host JCL, are kept in partitioned datasets (PDS) or partitioned datasets extended (PDSE) on the host. These files may be accessed and used through a project, such as an IBM® Multiple Virtual Storage (MVS®) project (IBM® and MVS® are registered trademarks of International Business Machines Corporation in the United States, other countries, or both.). The names appearing on the workstation for the host PDS and PDSE members depend upon how the MVS drives are defined during Remote Edit/Compile/Debug setup.

Remote Edit/Compile/Debug can provide many benefits. Host data sets may be accessed from the workstation. After completing the required configuration, a workstation project can connect to PDS or PDSE data sets on the host and include members in the project. These host files may then be accessed as if they were workstation files. Host files may be edited and compiled from the workstation. Jobs may be submitted, monitored, and debugged from the workstation.

However, using the Remote Edit/Compile/Debug for host development requires communications to be configured at the workstation and at the host. This configuration may be quite complex as the following configuration example illustrates.

Host configuration to support connectivity for Remote Edit/Compile/Debug may comprise the following steps:
1. Install, configure, and start a communications protocol on the host, such as the Transmission Control Protocol/Internet Protocol (TCP/IP).
2. Install and configure a remote execution server on the host, such as Remote Execution Server for MVS.
3. Further configure TCP/IP to automatically start the remote execution server. For example, by adding the following statements to a data set PROFILE.TCPIP:
AUTOLOG
RXPROC
ENDAUTOLOG
4. Install and configure a Network File System (NFS) server. Such configuration may be accomplished by modifying an NFS site attributes data set such that a default parameter 'nopcnfsd' is changed to 'pcnfsd'.
5. To enable file extension mapping, the site attributes data set may be further modified by changing the default parameter 'sfmax=0' to 'sfmax=1', and by changing the default parameter 'nofileextmap' to 'fileextmap'. A default file extension mapping data set may be specified by adding the parm 'sidefile(mapping_dsn)', where mapping_dsn is the name of the file extension mapping data set. The file extension mapping data set must have a name of the form hlq.NFS.MAPPING, where hlq can be any high level qualifier, and it must be allocated with DCB=(recfm=fb, lrecl=80, blksize=400). Such a file extension mapping data set may contain either a default or a user-specified mapping such as the following mappings:
col 1
|
V
\# NFS.MAPPING
\*\*.SYSADATA.ADT
\*\*.COBOL.CBL
\*\*.PLIOPT .PLI
\*\*.PLI.PLI
\*\*.COBCOPY.CPY
\*\*.OBJ.OBJ
\*\*.LOAD.EXE
\*\*.CLIST.CMD
\*\*.SIGYCLST.CMD
\*\*.CNTL.JCL
\*\*.JCL .JCL
\*\*.LISTING.LST
\*\*.OUTLIST.OUT
6. Install the Remote Edit/Compile/Debug host component.
7. Start TCP/IP and NFS server.

Workstation configuration to support connectivity for Remote Edit/Compile/Debug may comprise the following additional steps:
1. Install, configure, and start TCP/IP on the workstation.
2. Install and configure the NFS Client.
3. Start the NFS client with the following command:
net use m: \\yourhost\youruser,text,crlf yourpassword /user:youruser where youruser and yourpassword are a userid and password and where m is an available drive letter.
4. If the connection to the host was successful, disconnect before the next step using the disconnect command:
net use m:/d 5. To enable file extension mapping, reconnect to the host with mapping by specifying fileextmap with the following command:

net use m: \\yourhost\youruser,text,crlf,fileextmap your-password /user:youruser 6. Verify that the remote execution server is started by entering the following command:

rsh yourhost-lyouruser/password time which should provide the output of the time command if the remote execution server is running.

As the above demonstrates, conventional configuration of host workstation connectivity is complex with many opportunities for errors. Such complexity may also affect the performance and reliability of conventional host workstation connectivity. Thus, there is a clearly felt need for a method of, system for, and computer program product for providing an improved easy-to-use and more reliable user interface for configuring connections between a file system residing on the local workstation and a file system residing on a remote host system.

SUMMARY OF THE INVENTION

The present invention provides a user interface for configuring connections from a local workstation between a file system residing on the local workstation and a file system residing on a remote host system. The interface provides for such configuration by allowing the user to specify the host system, specify a host directory path within the host file system, and specify a mapping between a file within the host directory path on the host file system and a file on the local file system. After such configuration, the user may access the host file system file in the same manner as a local file system file.

One aspect of a preferred embodiment of the present invention provides a user interface method for configuring connections from a local workstation between a file system residing on the local workstation and a file system residing on a remote host system, the method comprising the steps of: specifying the host system; specifying a host directory path within the host file system; specifying a mapping between a file within the host directory path on the host file system and a file on the local file system; and accessing the host file system file in the same manner as a local file system file.

Another aspect of a preferred embodiment of the present invention provides for identifying a user of the host system as a part of the specifying of the host system.

Another aspect of a preferred embodiment of the present invention provides for specifying a mapping between a host code page in which data in the host file is represented and a local code page in which data in the local file is represented after being converted from the host code page representation as a part of the specifying of the host system.

Another aspect of a preferred embodiment of the present invention provides for specifying a mapping between the host directory path and a local directory path on the local file system as a part of the specifying of the host system.

Another aspect of a preferred embodiment of the present invention provides for specifying a data transfer type associated with files contained in the host directory path as a part of the specifying of the host directory path.

Another aspect of a preferred embodiment of the present invention provides for specifying of the mapping by: specifying a local file extension type, specifying a pattern describing host files to which the local file extension will be applied, and specifying a data transfer type applicable to mapped host files conforming to the pattern.

Another aspect of a preferred embodiment of the present invention provides for the interface displaying in a first portion of a display a visual indicia representing the host system, displaying in a second portion of the display a visual indicia representing the host directory, and displaying in a third portion of the display a visual indicia representing the mapping between the file within the host directory path on the host file system and the file on the local file system.

Another aspect of a preferred embodiment of the present invention provides for the interface displaying in a first portion of the display a visual indicia representing the local directory path, and displaying in a second portion of the display a visual indicia representing the converted and mapped local file within the local directory path.

A preferred embodiment of the present invention has the advantage of providing an improved user interface for configuring connections between a file system residing on the local workstation and a file system residing on a remote host system.

A preferred embodiment of the present invention has the further advantage of providing a mapping between a host directory or directories and a local drive.

A preferred embodiment of the present invention has the further advantage of providing a mapping between a host directory path and a local directory path.

A preferred embodiment of the present invention has the further advantage of providing a mapping between a host code page in which data in the host file is represented and a local code page in which data in the local file is represented after being converted from the host code page representation.

A preferred embodiment of the present invention has the further advantage of providing a data transfer type associated with files contained in the host directory path.

A preferred embodiment of the present invention has the further advantage of providing a local file extension type, a pattern describing host files to which the local file extension will be applied, and a data transfer type applicable to mapped host files conforming to the pattern.

A preferred embodiment of the present invention has the further advantage of providing an improved user interface displaying system connection information in a single multiple-pane window.

A preferred embodiment of the present invention has the further advantage of supporting multiple host file system formats.

A preferred embodiment of the present invention has the further advantage of providing concurrent connections to multiple host file systems.

A preferred embodiment of the present invention has the further advantage of providing a mapping to multiple types of host files.

BRIEF DESCRIPTION OF THE DRAWINGS

For a more complete understanding of the present invention and the advantages thereof, reference is now made to the Description of the Preferred Embodiment in conjunction with the attached Drawings, in which:

FIGS. 12, 13, 14, 15, 16, and 17 are data structures preferred in carrying out a preferred embodiment of the present invention.

DESCRIPTION OF THE PREFERRED EMBODIMENT

Figure 1:
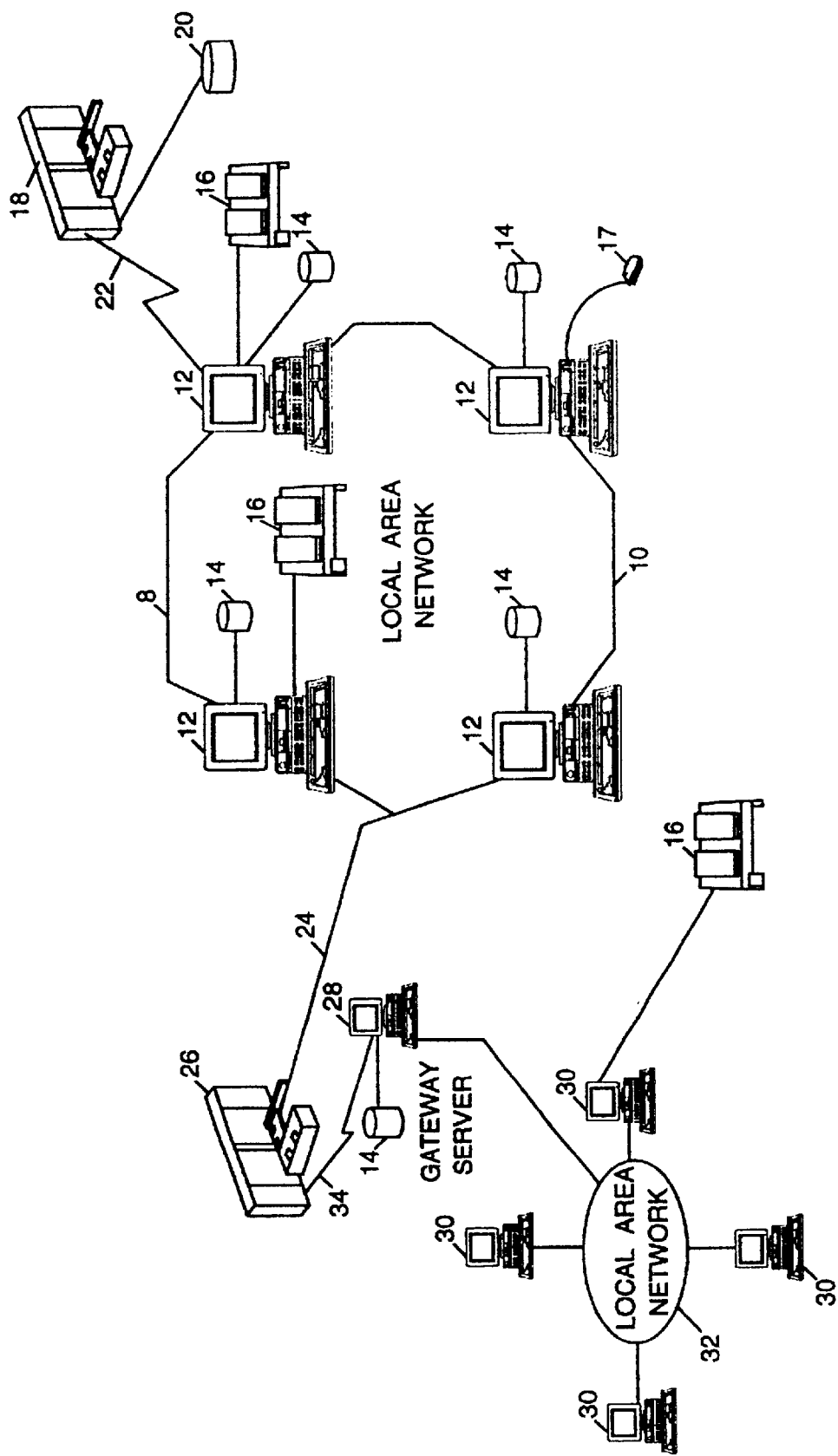
FIG. 1 is a block diagram of a distributed computer system used in performing the method of the present invention, forming part of the apparatus of the present invention, and which may use the article of manufacture comprising a computer-readable storage medium having a computer program embodied in said medium which may cause the computer system to practice the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user to perform host application development on a workstation 12 in lieu of performing the application development on the host 18 itself. Remote Edit/Compile/Debug provides such a workstation environment for performing the edit, compile, and debug tasks associated with host application development. Host application parts, such as COBOL source code, COBOL copy books, and host JCL, may be stored in PDS or PDSE data sets on storage device 20 connected to the host 18. The Remote Edit/Compile/Debug workstation environment allows these files to be accessed and used on the workstation 12. The present invention provides for such access and use of host files on the workstation 12 by connecting, mapping, and converting files and directories from the host 18 to the workstation 12 to support a scenario such as the Remote Edit/Compile/Debug.

A preferred embodiment of the present invention is implemented as a Remote System Connection Manager (RSC Manager). The RSC Manager provides a user interface for configuring connections from a local workstation between a file system residing on the local workstation and a file system residing on a remote host system. The interface provides for such configuration by allowing the user to specify the host system, specify a host directory path within the host file system, and specify a mapping between a file within the host directory path on the host file system and a file on the local file system. After such configuration, the user may access the host file system file as if it is a local file system file.

Figure 2:
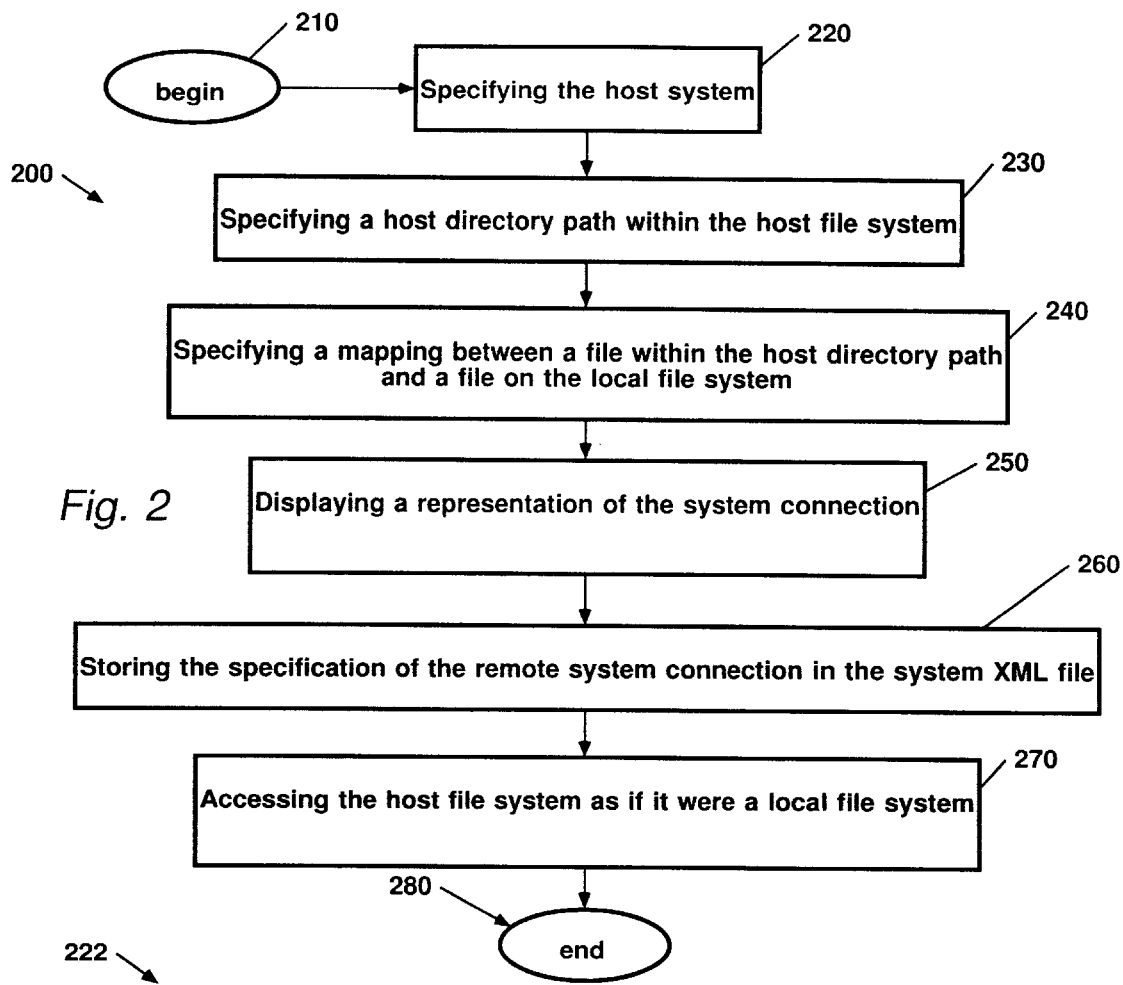
FIGS. 2, 3, 4 and 5 are flowcharts illustrating the operations preferred in carrying out a preferred embodiment of the present invention.
Figure 10:
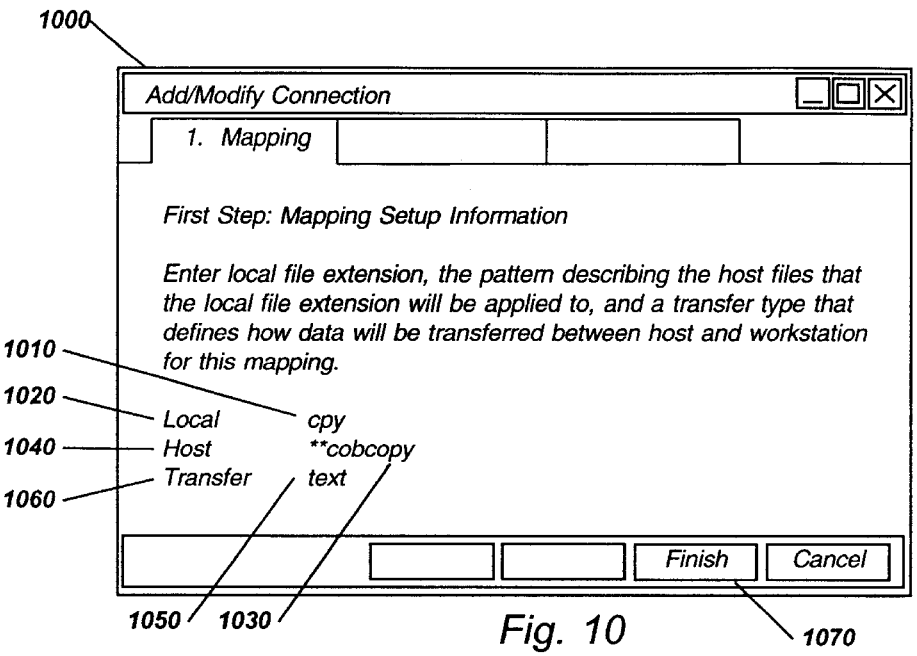
Figure 11:
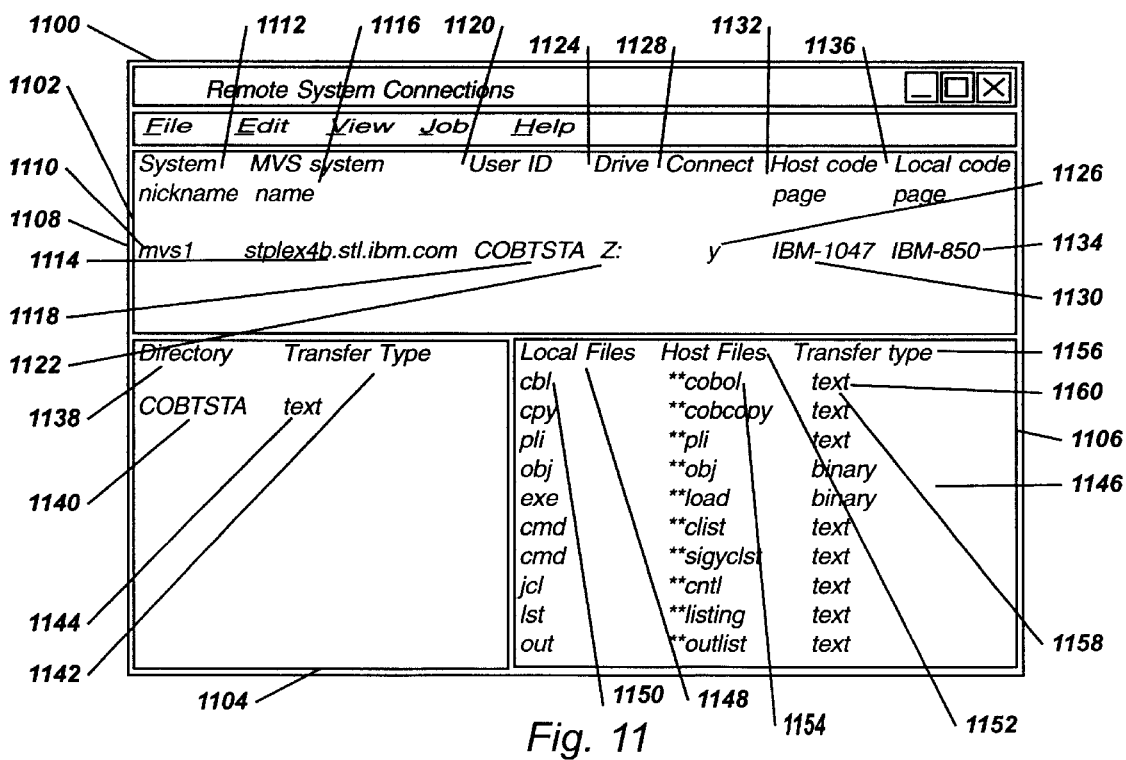

Referring first to FIG. 2, there is shown a flowchart 200 implementing the steps preferred in carrying out the preferred embodiment of the invention. After the start of the process 210, process block 220 allows the user to specify the host system through the use of a Add/Modify Connection Wizard which displays the sequence of Add/Modify dialogs 600, 700, and 800 shown in FIGS. 6, 7, and 8, respectively. After the user has specified the host system, process block 230 allows the user to specify a host directory path from which files will be transferred and the type of transfer through the use of a Directory Setup Wizard which displays the Directory Setup dialog 900 shown in FIG. 9. After the user has specified the host directory path, process block 240 allows the user to specify a mapping between the host directory path and a file on the local file system through the use of a Mapping Setup Wizard which displays the Mapping Setup dialog 1000 shown in FIG. 10. In response to this mapping, process block 250 displays a representation of the system connection in a Remote System Connections Manager window 1100 as shown in FIG. 11. Thereafter, process block 260 stores the specification of the remote system connection in a system data structure or file, preferably an XML file, 1300–1800 shown in FIGS. 12, 14, 15, 16, and 17, respectively. Process block 270 then uses this remote system connection specification to access the host file system as if it is a local file. The process then ends 280.

Figure 3:
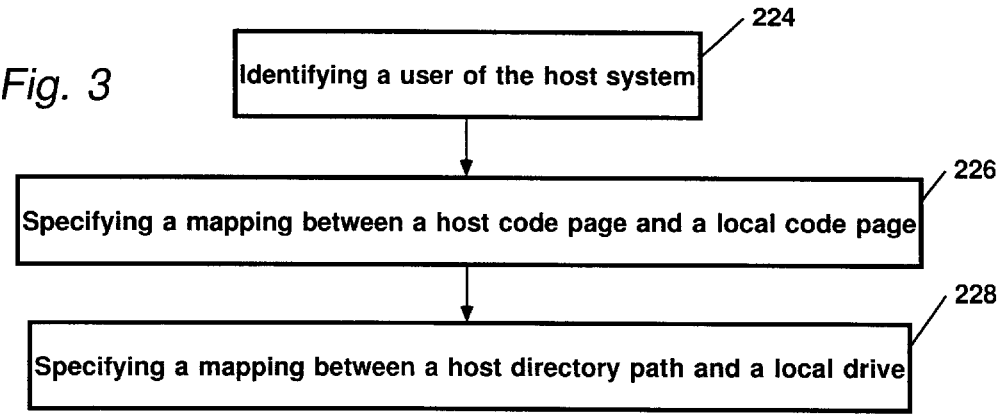
Figure 6:
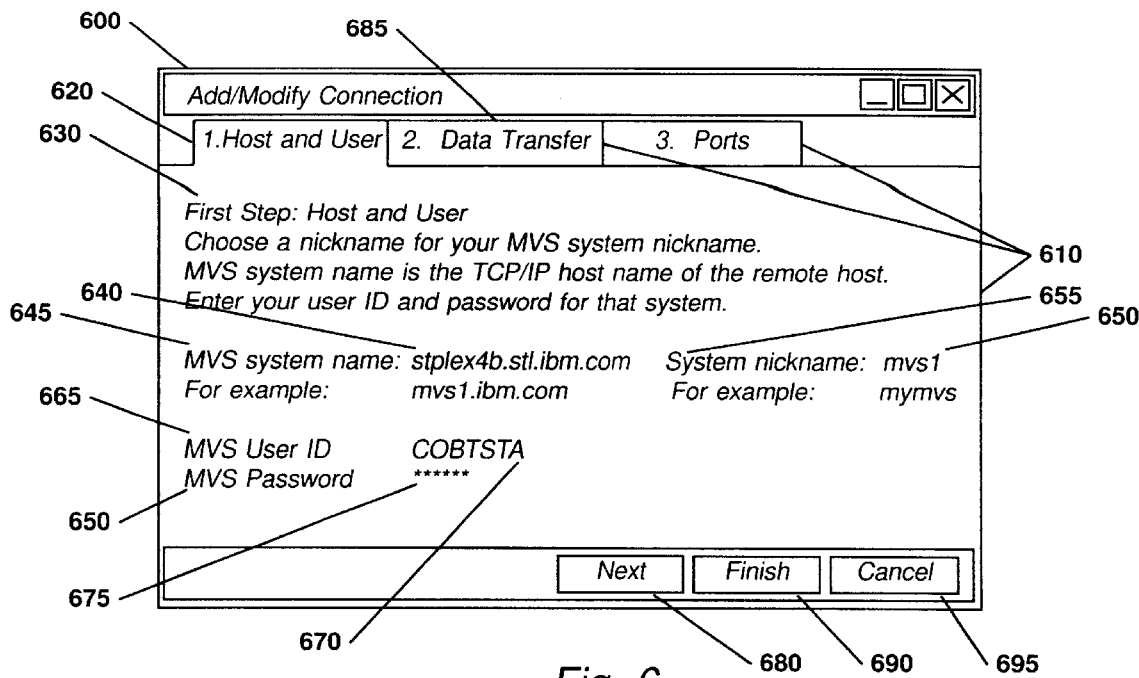
FIGS. 6, 7, 8, 9, 10, and 11 are graphical user interfaces preferred in carrying out a preferred embodiment of the present invention.
Figure 7:
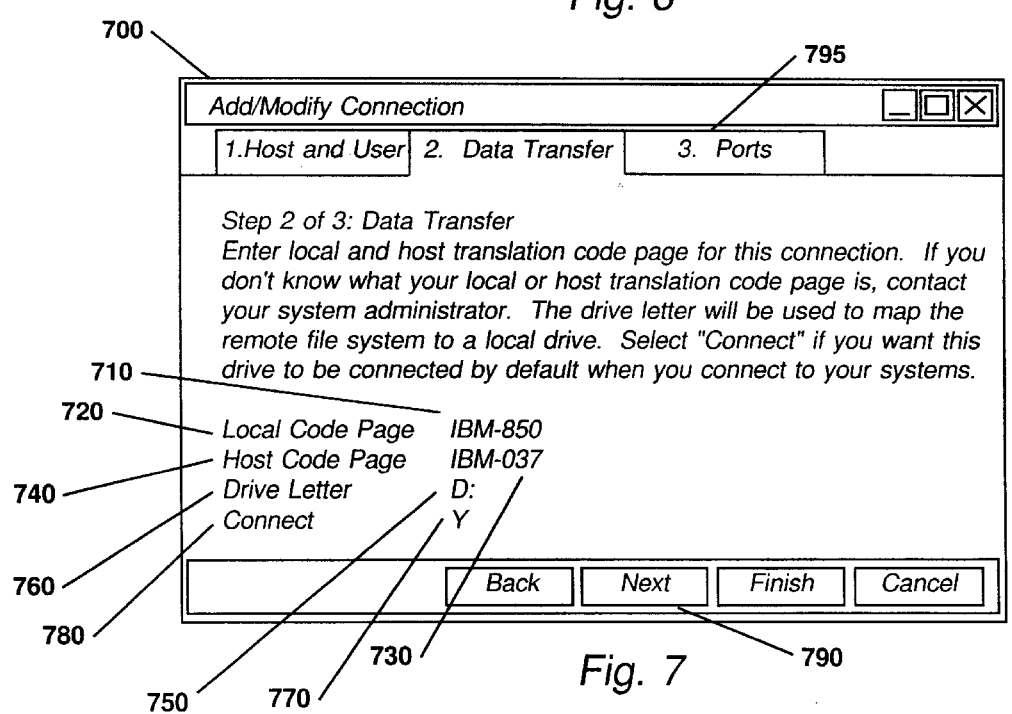
Figure 8:
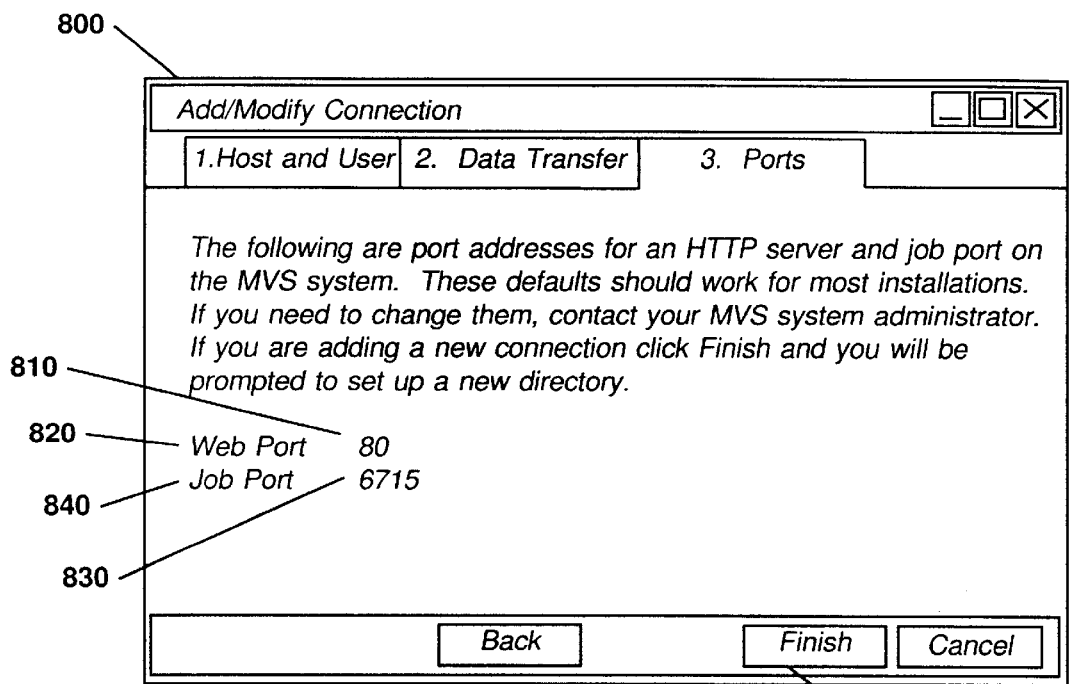

Referring now to FIG. 3, flowchart 222 illustrates process blocks 224, 226, and 228 which are an expansion of the function of process block 230 of FIG. 2. Process block 224 allows the user to identify the user of the host system through the use of entry fields 670 and 675 as shown in FIG. 6. Process block 226 allows the user to specify a mapping between a host code page and a local code page through the use of entry fields 710 and 730 as shown in FIG. 7. Process block 228 allows the user to specify a mapping between a host directory path and a local drive through the use of entry field 750 as shown in FIG. 7.

Figure 4:
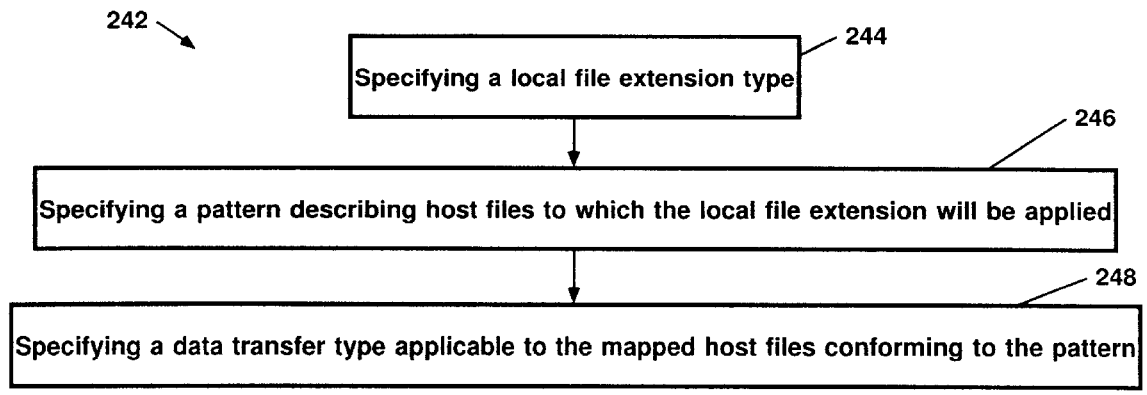

Referring now to FIG. 4, flowchart 242 illustrates process blocks 244, 246, and 248 which are an expansion of the function of process block 240 of FIG. 2. Process block 244 allows the user to specify a local file extension type through the use of entry field 1010 as shown in FIG. 10. Process block 246 allows the user to specify a pattern describing host files to which the local file extension will be applied through the use of entry field 1030 as shown in FIG. 10. Process block 248 allows the user to specify a data transfer type applicable to mapped host files conforming to the pattern through the use of entry field 1050 as shown in FIG. 10.

Figure 5:
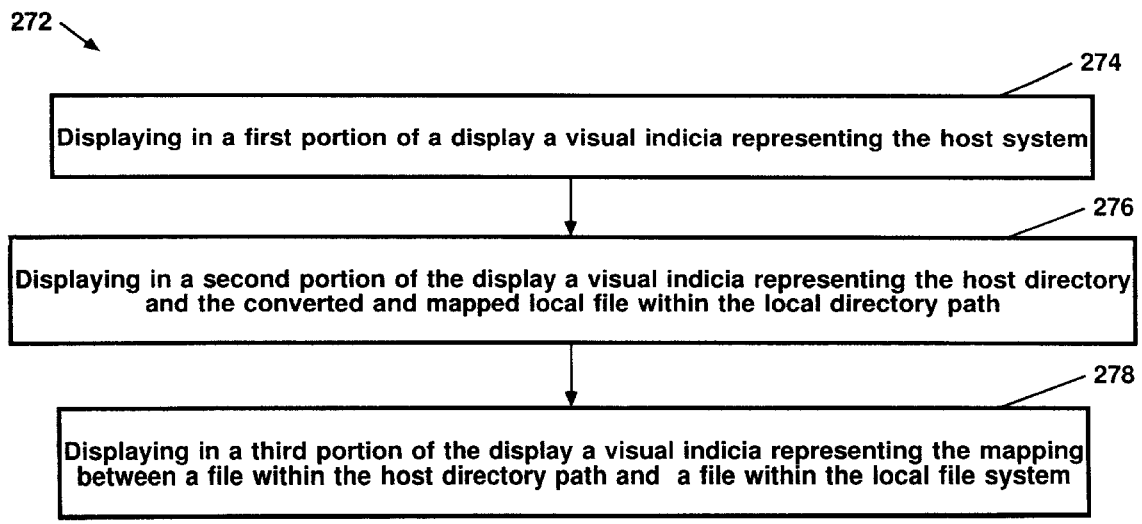

Referring now to FIG. 5, flowchart 272 illustrates process blocks 274, 276, and 278 which are an expansion of the function of process block 250 of FIG. 2. Process block 274 displays in a first portion 1110 of a window 1100, as shown in FIG. 11, a visual indicia 1108 representing the host system 18. Process block 276 displays in a second portion 1104 of the window 1100 a visual indicia 1140 representing the host directory. Process block 278 displays in a third portion 1106 of the window 1100 a visual indicia 1160 representing the mapping between the file 1154 within the host directory path on the host file system 20 and the file 1150 on the local file system 14.

Referring back now to FIGS. 6 through 11, the sequence of dialogs will now be presented in greater detail through a user scenario. In response to the user requesting or indicating a need for a new remote connection, an Add/Modify Connection Wizard window 600 is displayed to the user. In the preferred embodiment, this window 600 is structured as a tabbed notebook 610 from which the user may select a tab 620 to select a particular dialog 630 associated with that tab 620. The user is first presented with or may select the Host and User dialog 630. This Host and User dialog 630 provides entry fields allowing the user to enter a host system name, a nickname selected by the user for this host system name, the user's user identification or user ID, and the user's password for the host system. For example, in the Host and User dialog 630 depicted in FIG. 6, the user has specified "stplex4b.stl.ibm.com" 640 as the host system name 645, "mvs1" 650 as the host system nickname 655, "COBTSTA" 670 as the MVS user ID 665, and "*****" 675 as the MVS user's password 650. After completing these fields, the user may move to the Data Transfer dialog 700 by clicking on either the next button 680 or the Data Transfer tab 685. Alternatively, the user may click on the Finish button 690 to end the specification after this dialog, or the user may click on the cancel button 695**. to discard the specifications of this dialog.

Responsive to the user clicking on either the next button 680 or the Data Transfer tab 685, the user is presented the Data Transfer dialog 700 which allows the user to enter a local code page and a host code page for translation in this connection. The user may also enter a local system drive letter which will be used to map the remote file system to a local drive. In addition, the user may select Connect if the user wants this drive to be automatically connected by default when a remote connection is established with the host system. In the example Data Transfer dialog 700 depicted in FIG. 7, the user has specified "IBM-850" 710 as the Local Code Page 720, " IBM-037" 730 as the Host Code Page 740, "D" 750 as the Drive Letter 760, and "Y" 770 indicating an automatic default connection 780 for this drive. After completing these fields, the user may move to the Ports dialog 800 by clicking on either the next button 790 or the Ports tab 795.

Responsive to the user clicking on either the next button 790 or the Ports 795, the user is presented the Ports dialog 800 which allows the user to enter port addresses for a Hypertext Transport Protocol (HTTP) server and job port on the MVS host system. In the example Data Transfer dialog 800 depicted in FIG. 8, the user has specified "80" 810 as the web port 820 and "6715" 830 as the job port 840. After completing these fields, the user may indicate completion of the connection specification by clicking on the Finish button 850.

Figure 9:
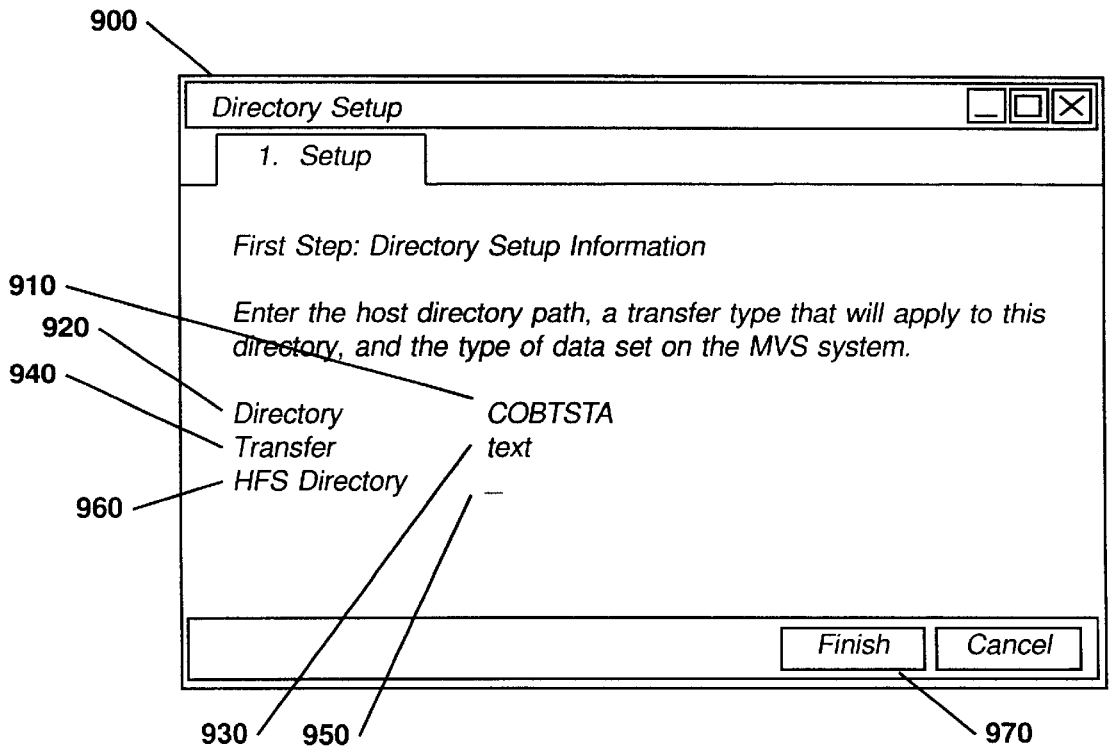

If the user is defining a new connection for which Directory Setup information has not been specified, then a Directory Setup Wizard 230 displays the Directory Setup window 900 shown in FIG. 9 in response to the user completion of the Add/Modify Connection Wizard dialogs 600, 700, and 800. The Directory Setup window 900 allows the user to enter a host directory path, a transfer type that will apply to this directory, and the type of data set on the MVS system. In the example Directory Setup dialog 900 depicted in FIG. 9, the user has specified "COBTSTA" 910 as the host directory path 920, specified "text" 930 as the transfer type 940 which applies to this host directory path 910, and a default 950 type of data set 960. After completing these fields 920, 940, and 960, the user may click on the Finish button 970 to complete the Directory Setup processing 230.

If the user has not yet specified a mapping between a file within the host directory path on the host file system and a file on the local file system, then a Mapping Setup Wizard 240 displays the Mapping Setup window 1000 shown in FIG. 10 in response to the user completion of the Directory Setup Wizard dialog 900. The Mapping Setup window 1000 allows the user to enter a local file extension, the pattern describing the host files that the local file extension will be applied to, and a transfer type that defines how data will be transferred between host and workstation for this mapping. In the example Mapping Setup dialog 1000 depicted in FIG. 10, the user has specified "cpy" 1010 as the local file extension 1020, "cobcopy" 1030 as the pattern 1040 describing the host files that the local file extension will be applied to, and "text" 1050 as the transfer type 1060 that defines how data will be transferred between host and workstation for this mapping . After completing these fields, the user may indicate completion of the connection specification by clicking on the Finish button 1070**.

Upon completion of the definition of a new remote system connection, the Remote System Connections Manager 1100 of FIG. 11 is displayed to the user. The Remote System Connections Manager 1100 comprises three panels: a Remote System Connections Panel 1102; a Directory Panel 1104; and a Mapping Panel 1106. The Remote System Connections Panel 1102 displays a list 1108 of remote system connections defined by the user and the attributes of each. For the remote system connection 1108 defined in the example, the Remote System Connections Panel 1102 displays "mvs1" 1110 as the System nickname 1112; "stplex4b.stl.ibm.com" 1114 as the MVS system name 1116; "COBTSTA" 1118 as the User ID 1120; "Z" 1122 as the Drive 1124, "Y" 1126 as the Connect status 1128; "IBM-1047" 1130 as the Host code page 1132; and "IBM-850" 1134 as the Local code page 1136.

For a selected remote system connection 1108, the Directory Panel 1104 displays the host directory path 1138 ("COBTSTA" 1140) and the transfer type 1142 ("text" 1144) which applies to this host directory path 1140. Also for this selected remote system connection 1108, the Mapping Panel 1106 displays a list 1146 of mappings defined for this remote system connection 1108, and displays for each defined mapping a local file extension 1148 ("cbl" 1150), the pattern 1152 ("cobol" 1154) describing the host files that the local file extension 1150 will be applied to, and a transfer type 1156 ("text" 1158) that defines how data will be transferred between host and workstation for this mapping 1160**.

Referring back to FIG. 2, the information defining and describing the remote system connection is stored 260 in a data structure, preferably a system XML file, which is illustrated in FIGS. 12, 13, 14, 15, 16, and 17.

Figure 12:
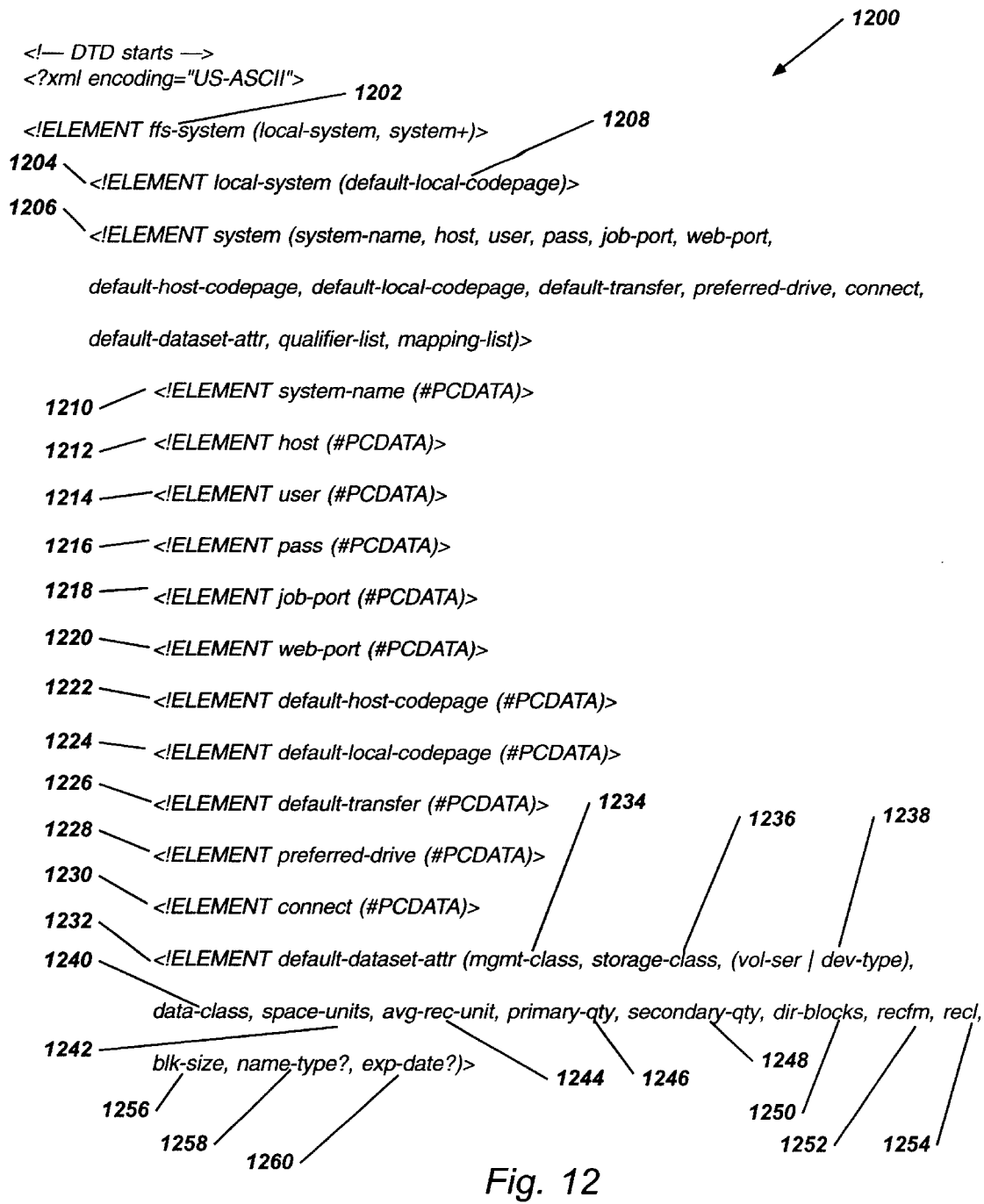

Referring first to FIG. 12, the preferred embodiment of the data structure is an Extensible Markup Language (XML) file stored in the memory, storage, or both of a computer system. The Document Type Definition (DTD) of the data structure is shown in FIG. 12, and XML in accordance with this DTD is shown in FIGS. 13, 14, 15, 16, and 17. Referring back to FIG. 12, the data structure 1200 is hierarchically structured with the storage element foreign file system 1202 (ffs-system) as a highest first-level node in a tree hierarchy. The storage element ffs-system 1202 comprises two second-level nodes in the tree hierarchy: local-system 1204 and system+1206, where local system stores information describing the local file system, and where system+ may be one or more elements each representing and describing a separate foreign file system on a remote host.

The storage element local-system 1204 further comprises a third-level node in the tree hierarchy: default-local-codepage 1208 which specifies the default codepage in which workstation data is encoded.

Figure 13:
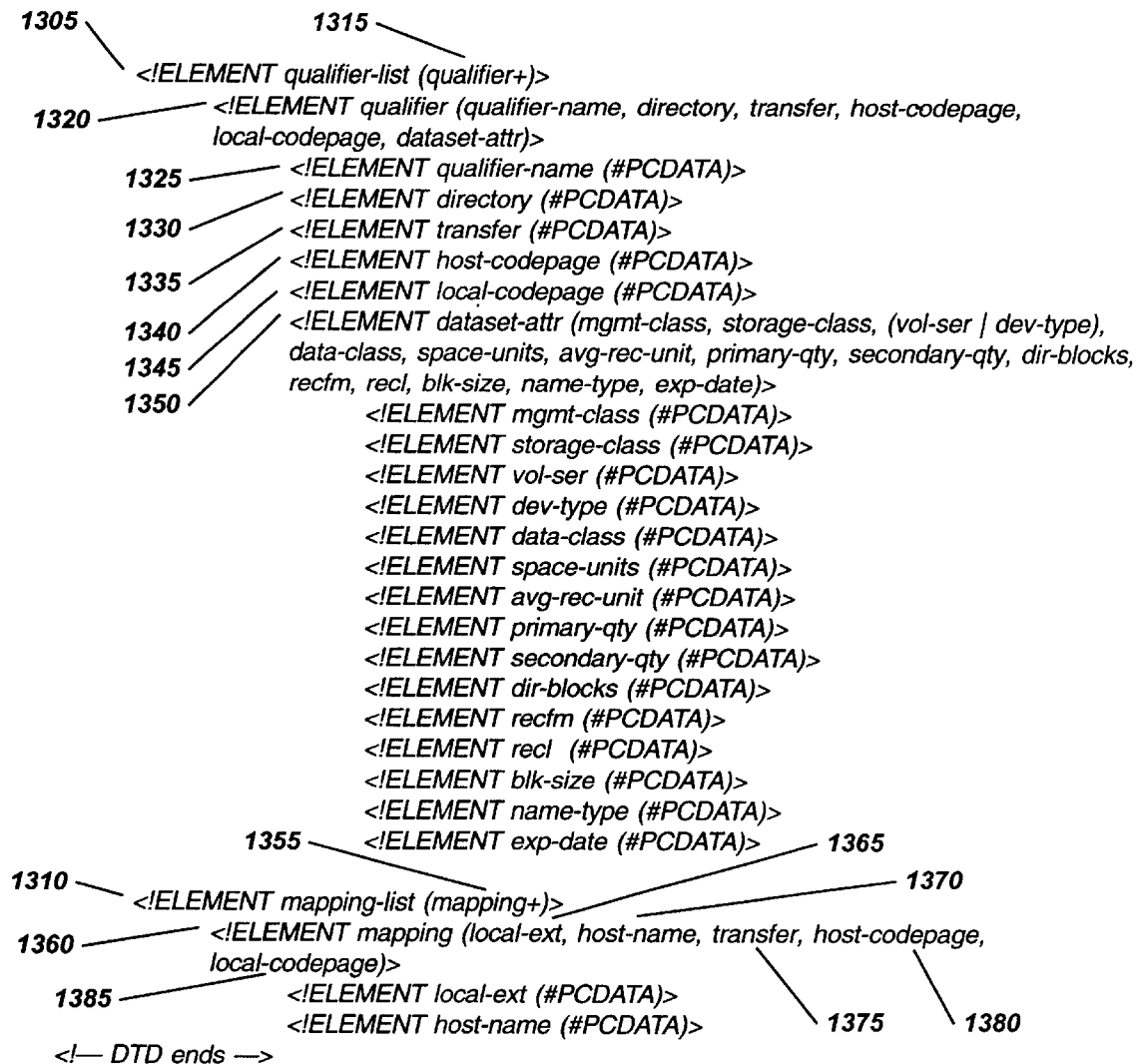

The storage element system+1206 further comprises a set of third-level nodes in the tree hierarchy: system-name 1210, host 1212, user 1214, pass 1216, job-port 1218, web-port 1220, default-host-codepage 1222, default-local-codepage 1224, default-transfer 1226, preferred-drive 1228, connect 1230, default-data set-attr 1232, qualifier-list 1305, and mapping-list 1310, where 1305 and 1310 are depicted in FIG. 13.

The storage element system-name 1210 contains a name comprising an alphanumeric string of characters unique within the Workstation Connection Manager. The storage element host 1212 stores a full TCP/IP name of a remote host or other system that can be resolved to full TCP/IP address by a domain name server (DNS). The storage element user 1214 contains the user ID of the user on the remote host, and the storage element pass 1216 contains the user's password on the remote host.

The storage element job-port 1218 contains an identification of a TCP/IP port for monitoring certain activities other than file system on the host, and the storage element web-port 1220 stores the TCP/IP communication port assigned to the foreign file system on the remote host.

The storage element default-host-codepage 1222 specifies the codepage in which the remote host data in encoded. A codepage is an assignment of graphic characters and control function meanings to all code points; for example, assignment of characters and meanings to 256 code points for an 8-bit code, assignment of characters and meanings to 128 code points for a 7-bit code. The storage element default-local-codepage 1224 specifies the codepage in which workstation data is encoded. The storage element default-transfer 1226 stores the type of transfer of data between the remote host and the local workstation. A binary transfer transmits data unmodified between host and workstation; whereas, a text transfer translates translatable text using host and local code pages from one to another. A transfer usually does not erase data from the original location.

The storage element preferred-drive 1228 contains a drive letter specification normally used on a workstation operating system to uniquely identify the connected file system (for example, C:) to the operating system. The storage element connect 1230 specifies whether or not the workstation drive should be automatically connected when a connection process is started with the remote host.

The storage element default-data set-attr 1232 comprises a set of attributes associated with the default dataset on the remote host system. The storage element qualifier-list 1305 comprises a set of qualifier names, each being a library-name that is used in a reference together with a text-name associated with that library. The storage element mapping-list 1310 comprises a list, usually in a profile, that establishes a correspondence between items in two groups; for example, a correspondence between file types on the host file system and on the workstation file system.

The storage element default-data set-attr 1232 further comprises a set of fourth-level nodes in the tree hierarchy: mgmt-class 1234, storage-class 1236, (vol-ser|dev-type) 1238, data-class 1240, space-units 1242, avg-rec-unit 1244, primary-qty 1246, secondary-qty 1248, dir-blocks 1250, recfm 1252, red 1254, blk-size 1256, name-type 1258, and exp-date 1260.

The storage element mgmt-class 1234 stores a named collection of management attributes describing the retention, backup, or class transition characteristics for a group of objects in a storage hierarchy. The storage element storage-class 1236 contains a named list of storage attributes. The list of attributes identifies a storage service level provided for data associated with the storage class. No physical storage is directly implied or associated with a given storage class name. The storage element (vol-ser|dev-type) 1238 contains the volume serial number and device type. The volume serial number is a number in a volume label assigned when a volume is prepared for use in a system. The device type is the name for a kind of device sharing the same model number.

The storage element data-class 1240 stores data-related information for the allocation of the dataset, which may include spaceunits, primary quantity, directory block, record format, record length and dataset name type. The storage element space-units 1242 contains an indication of the units of data storage space used for allocating a dataset; for example: track, cylinders, block, megabyte, or byte. The storage element avg-rec-unit 1244 stores a specification of the unit used when allocating average record length such as K for kilobytes. The storage element primary-qty 1246 stores the number of space units allocated. The storage element secondary-qty 1248 stores the secondary quantity which is related to the space units used in conjunction with the primary quantity when the primary quantity is insufficient for allocation. The storage element dir-blocks 1250 contain 256-byte areas that accommodate or store specific information about datasets. The storage element recfm 1252 contains a specification of the record format which is the definition of how data are structured in the records contained in a file. The record format definition may include record name, field names, and field descriptions, such as length and data type. The storage element red 1254 contains the record length or record size which specifies the number of characters or bytes in a record. The storage element blk-size 1256 contains the block size or block length which specifies the number of data elements in a block, and is usually specified in units such as records, words, computer words, or characters. The storage element name-type 1258 stores a specification of the type of storage element, and is usually either a partitioned dataset (PDS), a partitioned dataset extended (PDSE), or a sequential dataset. The storage element exp-date 1260 contains the expiration date, the date at which a file is no longer protected against automatic deletion by the system.

Referring now to FIG. 13, the storage element qualifier-list 1305 further comprises a set of fourth-level nodes in the tree hierarchy: qualifier+1315, where qualifier+1315 may be one or more elements each representing and describing a separate qualifier 1320. Each qualifier 1320 further comprises a set of fifth-level nodes or storage elements in the tree hierarchy: qualifier-name 1325, directory 1330, transfer 1335, host-codepage 1340, local-codepage 1345, and data set-attr 1350. The storage element qualifier-name 1325 stores a name modifier such as a library-name that is used in a reference together with a text-name associated with that library to make the name unique. The storage element directory 1330 stores a higher middle-level qualifier whose name is used to attach the host file system to the workstation file system. The storage element transfer 1335, the storage element host-codepage 1340, the storage element local-codepage 1345, the storage element data set-attr 1350, and the storage element transfer 1335 may contain overrides of the above defaults for this particular qualifier.

The storage element mapping-list 1310 further comprises a set of fourth-level nodes in the tree hierarchy: mapping+1355, where mapping+1355 may contain one or more elements each representing and describing a separate mapping 1360. Each storage element mapping 1360 further comprises a set of fifth-level nodes in the tree hierarchy: local-ext 1365, host-name 1370, transfer 1375, host-codepage 1380, and local-codepage 1385. The storage element local-ext 1365 contains a local workstation file extension that is used to map to a host file name. The storage element host-name 1370 stores a host dataset name pattern which is used to map PDS members to workstation file format. The pattern consists of normal data-set- name characters plus wild characters (such as an asterisk *). For example, the pattern "*.COB*" matches data-set names whose low-level qualifier starts with "COB" (such as "COB", "COBOL", and "COBCOPY").

Referring now to FIGS. 14, 15, 16, and 17, an XML system file 1400 in accordance with the DTD 1200 of the preferred embodiment is shown. The information describing the example remote system connection defined in FIGS. 6, 7, 8, 9, 10, 11, and 12 may be stored in the memory and storage 14 of the computer system 12 with the use of the XML system file data structure 1400. FIG. 14 shows that portion 1400 of the data structure storing the ffs-system 1402, the local-system 1404, and the system 1406.

The local-system 1404 stores the "IBM-850" 1408 entered into the Local Code Page 720 field as the default-local-codepage 1410. The system 1406 stores:

"ffsl" 1412 as the system-name 1414,

"stplex4b.stl.ibm.com" 1416 entered into the MVS System Name field 640 as the host 1418, "COBTSTA" 1420 entered into the MVS User field 670 as the user 1422, "sol1test" 1424 entered into the MVS Password field 675 as the pass 1426, "6715" 1428 entered into the Job Port field 830 as the job-port 1430, "80" 1432 entered into the Web Port field 810 as the web-port 1434, "IBM-037" 1436 entered into the Host Code Page field 730 as the default-host-codepage 1438, "IBM-850" 1440 entered into the Local Code Page field 710 as the default-local-codepage 1442, "text" 1444 entered into the Transfer Type field 930 as the transfer 1446, "D:" 1448 entered into the Drive Letter field 750 as the preferred-drive 1450, and "y" 1452 entered into the Connect field 770 as the connect 1454.

Figure 15:
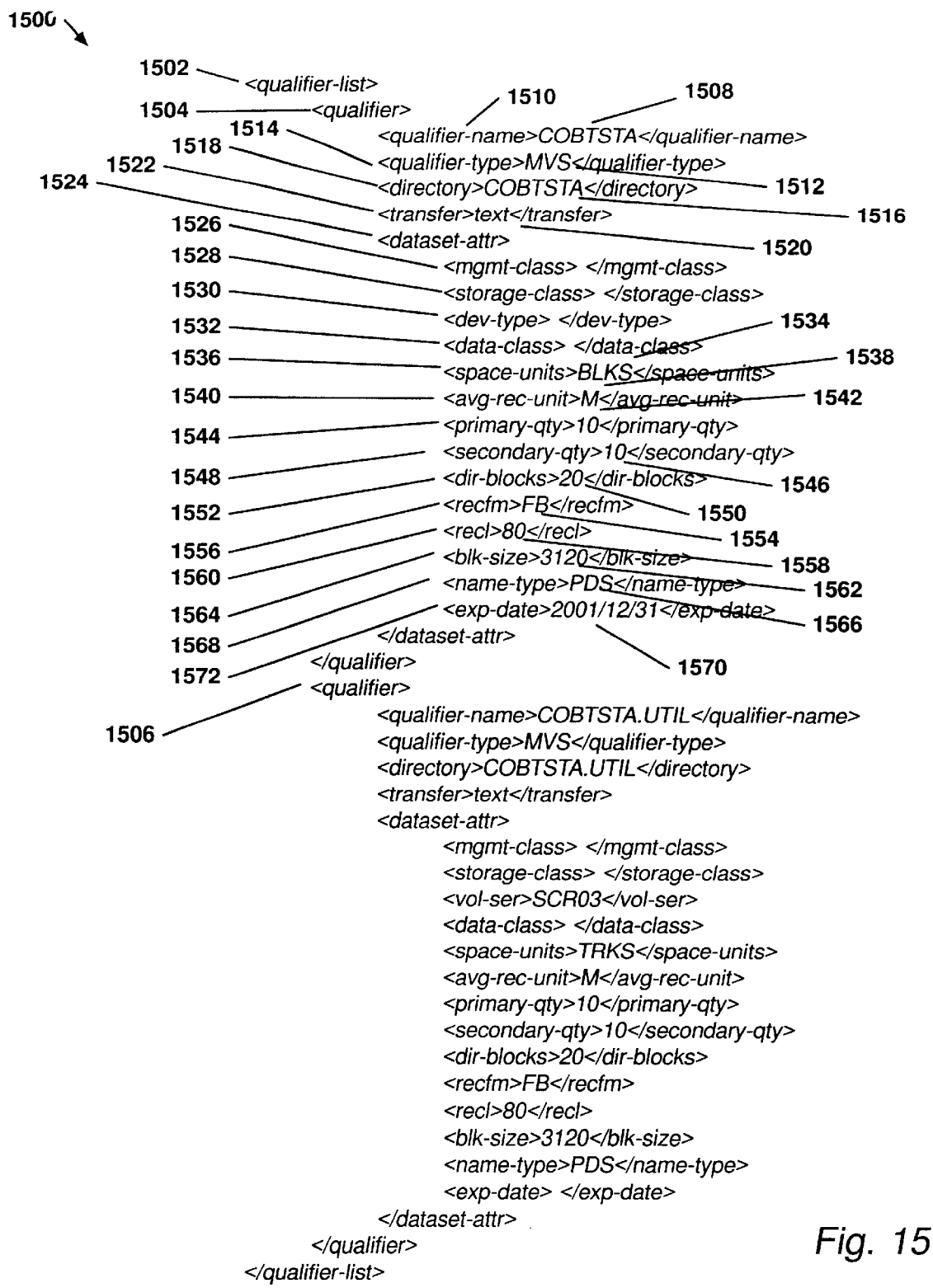

FIG. 15 shows that portion 1500 of the data structure storing the qualifier-list 1502 which in this example comprises two qualifiers: "COBTSTA" 1504 and "COBTST.UTL" 1506. The first qualifier 1504 stores:

"COBTSTA" 1508 entered into the Connect field 910 as the qualifier-name 1510, "MVS" 1512 as the qualifier-type 1514, "COBTSTA" 1516 entered into the Directory field 910 as the directory 1518, and "text" 1520 entered into the Transfer field 930 as the transfer 1522.

The first qualifier 1504 also stores in the storage element data set-attr 1524:

nulls for mgmt-class 1526, storage-class 1528, dev-type 1530, and data-class 1532, and "BLKS" 1534 as the space-units 1536, "M" 1538 as the avg-rec-unit 1540, "10" 1542 as the primary-qty 1544, "10" 1546 as the secondary-qty 1548, "20" 1550 as the dir-blocks 1552, "FB" 1554 as the recfm 1556, "80" 1558 as the red 1560, "3120" 1562 as the bik-size 1564, "PDS" 1566 as the name-type 1568, and "2001/12/31" 1570 as the exp-date 1572.

Corresponding information is also stored in the second qualifier "COBTSTA.UTIL" 1506.

FIGS. 16 and 17 show that portion 1600 of the data structure storing the mapping-list 1610 which for each mapping stores a local file extension, a pattern describing the host files that the local file extension will be applied to, and a transfer type that defines how data will be transferred between host and workstation for this mapping. In the example Mapping Panel 1106 of the Remote Host Connections Manager 1100 depicted in FIG. 11, the user has entered ten mappings specifying local-ext 1620, host-name 1630, and transfer 1640 for each mapping. These mappings are stored in the XML file data structure 1600 as follows:

| <local-ext> 1620 | <host-name> 1630 | <transfer> 1640 |
|---|---|---|
| cbl | **cobol | text |
| cpy | **cobcopy | text |
| pli | **pli | text |
| obj | **obj | binary |
| exe | **load | binary |
| cmd | **clist | text |
| cmd | **sigyclst | text |
| jcl | **cntl | text |
| lst | **listing | text |
| out | **outlist | text |

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, cpu, memory, storage devices, communication links, communication devices, servers, I/O devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

I claim:

1. A method of providing a user interface for configuring connections from a local workstation between a file system residing on the local workstation and a file system residing on a remote host system, said method comprising the steps of:
   specifying the host system;
   specifying a host directory path within the host file system;
   specifying a mapping between a file within the host directory path on the host file system and a file on the local file system; and
   accessing the host file system file in the same manner as a local file system file.

2. The method of claim 1 wherein the specifying of the host system step further comprises:
   identifying a user of the host system.

3. The method of claim 2 wherein the specifying of the host system step further comprises:
   specifying a mapping between a host code page in which data in the host file is represented and a local code page in which data in the local file is represented after being converted from the host code page representation.

4. The method of claim 1 wherein the specifying of the host system step further comprises:
   specifying a mapping between the host directory path and a drive on the local file system.

5. The method of claim 1 wherein the specifying of the host directory path step further comprises:
   specifying a data transfer type associated with files contained in the host directory path.

6. The method of claim 1 wherein the specifying of the mapping step further comprises:
   specifying:
      a local file extension type;
      a pattern describing host files to which the local file extension will be applied; and
      a data transfer type applicable to mapped host files conforming to the pattern.

7. The method of claim 1 wherein the accessing of the host file system step further comprises:
   displaying in a first portion of a display a visual indicia representing the host system;
   displaying in a second portion of the display a visual indicia representing the host directory;
   displaying in a third portion of the display a visual indicia representing the mapping between the file within the host directory path on the host file system and the file on the local file system.

8. The method of claim 1 wherein the accessing of the host file system step further comprises:
   displaying in a first portion of the display a visual indicia representing the local directory path; and
   displaying in a second portion of the display a visual indicia representing a converted and mapped local file within the local directory path.

9. An article of manufacture for use in a computer system for configuring connections from a local workstation between a file system residing on the local workstation and a file system residing on a remote host system, said article of manufacture comprising a computer-readable storage medium having a computer program embodied in said medium which causes the computer system to execute the method steps comprising:
   specifying the host system;
   specifying a host directory path within the host file system;
   specifying a mapping between a file within the host directory path on the host file system and a file on the local file system; and
   accessing the host file system file in the same manner as a local file system file.

10. The article of manufacture of claim 9 wherein the specifying of the host system step further comprises:
   identifying a user of the host system.

11. The article of manufacture of claim 10 wherein the specifying of the host system step further comprises:
   specifying a mapping between a host code page in which data in the host file is represented and a local code page in which data in the local file is represented after being converted from the host code page representation.

12. The article of manufacture of claim 9 wherein the specifying of the host system step further comprises:
   specifying a mapping between the host directory path and a drive on the local file system.

13. The article of manufacture of claim 9 wherein the specifying of the host directory path step further comprises:
   specifying a data transfer type associated with files contained in the host directory path.

14. The article of manufacture of claim 9 wherein the specifying of the mapping step further comprises:
   specifying:
      a local file extension type;
      a pattern describing host files to which the local file extension will be applied; and
      a data transfer type applicable to mapped host files conforming to the pattern.

15. The article of manufacture of claim 9 wherein the accessing of the host file system step further comprises:
   displaying in a first portion of a display a visual indicia representing the host system;
   displaying in a second portion of the display a visual indicia representing the host directory; and displaying in a third portion of the display a visual indicia representing the mapping between the file within the host directory path on the host file system and the file on the local file system.

16. The article of manufacture of claim 9 wherein the accessing of the host file system step further comprises:

displaying in a first portion of the display a visual indicia representing the local directory path; and displaying in a second portion of the display a visual indicia representing the a converted and mapped local file within the local directory path.

17. A distributed computer system for providing a user interface for configuring connections from a local workstation between a file system residing on the local workstation and a file system residing on a remote host system, said distributed computer system comprising:

a user interface for specifying the host system;

a user interface for specifying a host directory path within the host file system;

specifying a mapping between a file within the host directory path on the host file system and a file on the local file system; and a file access method for accessing the host file system file in the same manner as a local file system file.

18. The distributed computer system of claim 17 wherein the user interface for the specifying of the host system further comprises:

a user interface for identifying a user of the host system.

19. The distributed computer system of claim 18 wherein the user interface for the specifying of the host system further comprises:

a user interface for specifying a mapping between a host code page in which data in the host file is represented and a local code page in which data in the local file is represented after being converted from the host code page representation.

20. The distributed computer system of claim 17 wherein the user interface for the specifying of the host system further comprises:

a user interface for specifying a mapping between the host directory path and a drive on the local file system.

21. The distributed computer system of claim 17 wherein the user interface for the specifying of the host directory path further comprises:

a user interface for specifying a data transfer type associated with files contained in the host directory path.

22. The distributed computer system of claim 17 wherein the user interface for the specifying of the mapping further comprises:

a user interface for specifying:
  a local file extension type;
  a pattern describing host files to which the local file extension will be applied; and
  a data transfer type applicable to mapped host files conforming to the pattern.

23. The distributed computer system of claim 17 wherein the file access method for accessing the host file system further comprises:

a user interface for displaying in a first portion of a display a visual indicia representing the host system;

a user interface for displaying in a second portion of the display a visual indicia representing the host directory; and a user interface for displaying in a third portion of the display a visual indicia representing the mapping between the file within the host directory path on the host file system and the file on the local file system.

24. The distributed computer system of claim 17 wherein the file access method for accessing the host file system further comprises:

a user interface for displaying in a first portion of the display a visual indicia representing the local directory path; and a user interface for displaying in a second portion of the display a visual indicia representing a converted and mapped local file within the local directory path.

* * * * *